United States Patent

Izaki et al.

[11] Patent Number: 5,835,805
[45] Date of Patent: Nov. 10, 1998

[54] FILM TRANSPORTING DEVICE OF CAMERA AND CLUTCH STRUCTURE AND CAMERA WITH MAGNETIC RECORDING FUNCTION

[75] Inventors: Toshihiko Izaki, Asaka; Yasuhiko Tanaka, Omiya, both of Japan

[73] Assignees: Fuji Photo Film Co., Ltd., Kanagawa; Fuji Photo Optical Co., Ltd., Saitama, both of Japan

[21] Appl. No.: 833,126

[22] Filed: Apr. 4, 1997

[30] Foreign Application Priority Data

Apr. 8, 1996 [JP] Japan .................................. 8-085336
Apr. 18, 1996 [JP] Japan .................................. 8-096871

[51] Int. Cl.⁶ .................................................. G03B 1/00
[52] U.S. Cl. .......................... 396/411; 396/413; 396/418
[58] Field of Search .................................. 396/310, 319, 396/387, 411, 412, 413, 414, 415, 416, 417, 418; 411/329; 74/575, 577 SF, 577 S; 192/46

[56] References Cited

U.S. PATENT DOCUMENTS

| | | | |
|---|---|---|---|
| 3,200,918 | 8/1965 | Horn | 192/146 |
| 3,667,307 | 6/1972 | Kelch | 74/126 |
| 4,401,006 | 8/1983 | Sekiguchi | 192/46 |
| 5,113,208 | 5/1992 | Stoneham et al. | 396/319 |
| 5,437,416 | 8/1995 | Ezawa et al. | 396/387 |
| 5,456,419 | 10/1995 | Ezawa | 396/413 |
| 5,521,667 | 5/1996 | Egawa et al. | 396/407 |
| 5,555,050 | 9/1996 | Wakabayashi et al. | 396/406 |
| 5,568,214 | 10/1996 | Stiehler | 396/411 |
| 5,576,784 | 11/1996 | Tsunefuji et al. | 396/418 |
| 5,617,168 | 4/1997 | Stephenson, III et al. | 396/413 |

FOREIGN PATENT DOCUMENTS

| | | |
|---|---|---|
| 3-54920 | 5/1991 | Japan . |
| 8-271970 | 10/1996 | Japan . |
| 8-320521 | 12/1996 | Japan . |

Primary Examiner—Eddie C. Lee
Attorney, Agent, or Firm—Young & Thompson

[57] ABSTRACT

A film transporting device transports photographic film by driving a spool of a cartridge and a takeup spool which takes up the photographic film supplied from the cartridge by means of a single motor which is rotatable forward and backward. Unidirectional rotational driving force is transmitted from the motor to the spool and the takeup spool via one planet gear mechanism, and the photographic film is supplied from the cartridge, and then the takeup spool takes up the photographic film. The rotational driving force from the motor in the other direction is transmitted to the spool via the planet gear mechanism, and the photographic film is rewound into the cartridge. When the takeup spool takes up the photographic film, a one way clutch can absorb a difference of the transport speed between the takeup spool and the spool of the cartridge.

12 Claims, 14 Drawing Sheets

FILM TRANSPORTING DEVICE OF CAMERA AND CLUTCH STRUCTURE AND CAMERA WITH MAGNETIC RECORDING FUNCTION

BACKGROUND OF THE INVENTION

1. Field of the Invention

The present invention relates to a camera which is provided with a spool driving shaft coupled to a spool of a cartridge and a takeup spool for taking up photographic film supplied from the cartridge. More particularly, the present invention relates to a film transporting device of a camera which drives the spool driving shaft and the takeup spool by a single motor, a clutch structure suitable for a driving force transmission system of the film transporting device, and the camera with the magnetic recording function which records magnetic information relating to frame images captured by the camera onto a magnetic recording layer on the photographic film while the photographic film is fed one frame at a time.

2. Description of the Related Art

Recently a new standard of photographic film cartridge has been published. This cartridge contains the whole photographic film when it is not used. When the cartridge is mounted in a camera, etc., the leader of the photographic film is driven out of the cartridge through a film doorway by the rotation of a spool of the cartridge. The back of the photographic film is coated with a transparent magnetic recording layer.

The camera using the above-mentioned cartridge is capable of recording photographic information, print information, etc. relating to each frame subject to photographing by means of a magnetic head in the camera. The information is recorded at positions corresponding to each frame on both sides of the film in the direction of length thereof. When the film is transported, angular velocity of the motor is detected so as to keep the transport speed uniform so that the recording wavelength can be prevented from changing during the magnetic recording.

In an ordinary film transporting device of a camera, a spool driving shaft for driving a spool of the cartridge is provided in a cartridge chamber arranged at one side of an aperture. A takeup spool for taking up the photographic film fed from the cartridge is provided in a film takeup chamber arranged at the other side of the aperture. A single motor is rotated forward or backward to rotate the spool driving shaft and the takeup spool in a film wind direction or a film rewind direction so that the film can be wound or rewound.

A circumferential speed of the takeup spool is from about 1.5 to 2 times as fast as the film feed speed so that the film leader can be caught by the takeup spool without fail. For this reason, a spool driving shaft disengaging means is required. After the film is wound around the takeup spool, the spool driving shaft disengaging means disengages the spool driving shaft from the motor, and makes the spool driving shaft rotate with the transport of the film. The film is wound only by the rotation of the takeup spool. When the film is rewound, a takeup spool disengaging means is required which disengages the takeup spool from the motor so as to rewind the film only by the rotation of the spool driving shaft.

Several film transporting devices are well known which can achieve the above-described functions by means of a single motor for transporting the film. In a device disclosed by Japanese Utility Model Provisional Publication No. 3-54920, two planet gear mechanisms are used, and one switches driver and follower of the spool driving shaft, and the other one engages or disengages the takeup spool with or from the motor when the film is wound or rewound. In another example, one planet gear mechanism and two clutches are used, and the planet gear mechanism switches the rotating direction of the spool driving shaft when the film is wound or rewound, and one clutch switches driver and follower of the spool driving shaft when the film is wound, and the other clutch engages or disengages the takeup spool with or from the motor.

The above-mentioned conventional film transporting devices, however, have a problem in that the structure can be complicated because many planet gear mechanisms and clutches must be used. Particularly, if many planet gear mechanisms are used, the costs are increased. In addition, a space is required for the planet gear to retreat so as to switch the engaging and the disengaging, and the space for incorporating the planet gear mechanism must be large. Moreover, the use of many clutches results in the increase in the number of parts and the assembling trouble, thereby increasing the costs.

Furthermore, in order to record the magnetic information onto the magnetic recording layer on the photographic film, the film must be transported at a constant speed while the film is wound. Thus, the rotating speed of the motor for transporting the film is controlled while the film transport speed is monitored. Thus, the rotating speed of the motor is changed while the film is transported. If, however, the driver and follower of the spool driving shaft are switched, the load changes greatly at the time of switching, and thus it is difficult to maintain an even film transport speed.

Examples of photographic information recorded onto the magnetic recording layer on the photographic film during photographing are a print format indicating a standard size, a high-vision size or a panorama size; the number of prints; a shutter speed; and an f-stop value; in addition to a photographing date and a title which are printed together with photographic images during printing. The photographic information is recorded as a digitized magnetic signal onto the magnetic recording layer on the film when the photographic film is fed by one frame after photographing. The applicant of the present invention has proposed a camera which records the magnetic data in the above-mentioned manner (Japanese Patent Application Nos. 7-77849 and 7-128233).

Next, an explanation will be given of a conventional clutch used in the above-mentioned film transporting device.

FIG. 14 illustrates an example of structure of the conventional clutch. The illustrated clutch is a one way clutch which unidirectionally transmits the rotational driving force, and it is constructed in such a manner that a clutch plate 220 and cylindrical rollers (sprags) 230, 230, 230 are arranged between a driving gear 202 rotated by the rotating force from the motor and a driven gear 210 engaging with the spool driving shaft of the cartridge.

Three projections 204, 204, 204 are formed on the back of the driving gear 202, and these projections 204, 204, 204 engage with a hole 222 of the clutch plate 220. The driving gear 202 and the clutch plate 220 rotate in one united body. Three pawls 226, 226, 226 are formed on the clutch plate 220 in the direction of the diameter, and the sprags 230, 230, 230 are inserted into spaces defined by the sides of the pawls 226, 226, 226 and an inner peripheral surface 212 of the driven gear 210.

When the driving gear 202 rotates clockwise in the drawing, relatively to the driven gear 210, the sprags 230, 230, 230 eat into the side of the end of each pawl 226 and the inner peripheral surface 212 to serve as wedges, and the driven gear 210 and the driving gear 202 rotate while engaging with each other. On the other hand, when the driving gear 202 rotates counterclockwise in the drawing relatively to the driven gear 210, the sprags 230, 230, 230 become free in the spaces defined by the sides of the pawls 226, 226, 226 and the inner peripheral surface 212 of the driven gear 210, and the driving force of the driving gear 202 is not transmitted to the driven gear 210, and the driving gear 202 runs idle with respect to the driven gear 210.

The one way clutch, however, has a disadvantage because the film transport speed cannot be kept uniform because the load changes greatly in the rotating direction from the state wherein the sprags engage and the driven gear 210 is rotated by the driving force of the driven gear 202 (the engaging state) to the moment when the sprags disengage and the driven gear 210 starts running idle with respect to the driving gear 202, that is, the moment when the engagement of the sprags is released.

FIG. 15 illustrates another one way clutch which is well known and is provided with pawls 242, 242, 242, which are formed on the outer peripheral surface of a clutch plate 240 and elastically swingable in the diametrical direction of the clutch plate 240, and projections 216, 216, 216, which are formed on the inner peripheral surface of the driven gear 210 and engage with the tips of the pawls 242, 242, 242 only when the clutch plate 240 rotates in one direction (clockwise in the drawing). In such clutch structure, however, the tip of each pawl 242 slides on the inner peripheral surface of the driven gear 210 and falls into the step of the projections 216, 216, 216 while the clutch runs idle. Thus, there is such a disadvantage that, while the clutch runs idle, the load changes greatly in the diameter direction of rotation, and the film transport speed cannot be kept uniform. In addition, the arms of the pawls 242, 242, 242 cannot be long because there are many pawls, and thus the spring constant of the arms is large, and the load changes greatly when the pawls 242, 242, 242 fall into the steps of the projections 216, 216, 216.

The film transport speed must be uniform in order to satisfactorily record the magnetic signals onto the magnetic recording layer on the photographic film. If there is a change in the film transport load, etc., the film transport speed and the pitch of the digitized magnetic signals cannot be constant. For this reason, error takes place when the magnetic signals are read, or the magnetic signals cannot be read at all.

SUMMARY OF THE INVENTION

The present invention has been developed under the above-described circumstances, and has its object the provision of a film transporting device of a camera wherein the structure is simple and a space for incorporation can be reduced, and which can keep the film transport speed uniform and requires low costs.

The present invention has as another object the provision of a clutch mechanism wherein the load changes little when the clutch runs idle, or when the clutch shifts from the engaging state to the disengaging state, and a camera with a magnetic recording function which can satisfactorily record magnetic data onto a magnetic recording layer on photographic film by using the clutch structure to keep the film transport speed uniform when the film is fed by one frame after photographing.

To achieve the above-mentioned object, the present invention is characterized in that only one planetary mechanism and one clutch are necessary to the film transporting device to obtain the above-stated film transporting function. Thus, the present invention comprises: a cartridge chamber for housing a cartridge in which photographic film is wound around a single spool rotatably provided at a casing of the cartridge; a spool driving member for transmitting rotational driving force to the spool, the spool driving member coupling with the spool of the cartridge housed in the cartridge chamber; a takeup spool for taking up the photographic film supplied from the cartridge; a takeup spool driving member for transmitting rotational driving force to the takeup spool; a single motor capable of rotating forward and backward; a planetary mechanism consisting of a sun gear to which rotational driving force is transmitted from the motor, first and second planet gears engaging with the sun gear, and a carrier supporting the first and second planet gears; a spool driving force transmission mechanism including a first transmission gear engaged with the first planet gear when rotational driving force of the motor in one direction is transmitted to the sun gear and the carrier is positioned at a film winding position, and a second transmission gear engaged with the second planet gear when rotational driving force of the motor in the other direction is transmitted to the sun gear and the carrier is positioned at a film rewinding position, the spool driving force transmission mechanism transmitting rotational driving force in a film feed direction from the first transmission gear to the spool driving member, and transmitting rotational driving force in a film rewind direction from the second transmission gear to the spool driving member; a takeup spool driving force transmission mechanism including a third transmission gear engaged with the second planet gear when the rotational driving force of the motor in the one direction is transmitted to the Sun gear and the carrier is positioned at the winding position, the takeup spool driving force transmission mechanism transmitting rotational driving force in a film takeup direction from the third transmission gear to the takeup spool driving member; and a clutch provided between the first and second transmission gears, the clutch prohibiting rotational driving force applied to the first transmission gear by the spool driving member from being transmitted to the first transmission gear when the carrier is positioned at the film winding position. The first and second transmission gears are disposed coaxially with each other and rotatable relatively to each other; and the clutch is a one way clutch transmitting rotational driving force in only one direction from the first transmission gear to the second transmission gear.

To achieve the above-mentioned object, a clutch structure of the present invention comprises: an inner rotating member having a single pawl on an outer peripheral surface thereof, the pawl extending in a circumferential direction of the inner rotating member and having a central angle of more than 180° from a base end thereof to a tip thereof, the tip being elastically swingable in a diametrical direction of the inner rotating member; and an outer rotating member coaxially surrounding the inner rotating member, the outer rotating member having an inner peripheral surface on which the tip of the pawl of the inner rotating member slides and having a projection on the inner peripheral surface, the projection engaging with the tip of the pawl of the inner rotating member only when the inner rotating member rotates relatively to the outer rotating member in a direction from the base end of the pawl to the tip of the pawl.

In the above-described clutch structure, when the inner rotating member is the driver and rotates in a rotating direction from the base end of the pawl to the front, the driving force is transmitted from the inner rotating member to the outer rotating member so that the end of the pawl can be engaged with the projection formed on the inner peripheral surface of the outer rotating member. When the angular velocity of the outer rotating member is higher than that of the inner rotating member, the tip of the inner rotating member's pawl is disengaged from the projection of the inner peripheral surface of the driven member, and the driving force is not transmitted from the inner rotating member to the outer rotating member. When the clutch shifts from the engaging state wherein the driving force is transmitted from the inner rotating member to the outer rotating member to the disengaging state wherein the driving force is not transmitted, only the tip of the inner rotating member's pawl disengages from the projection of the inner peripheral surface of the outer rotating member. For this reason, the load change in the rotating direction is small. While running idle, the inner rotating member rotates backward relatively to the outer rotating member. When the tip of the pawl becomes closer to the projection, the tip of the pawl slides on the inner peripheral surface of the outer rotating member, and the pawl swings in the diameter direction to avoid the projection. When the tip of the pawl passes the projection, it falls into the step of the projection by the elasticity of the pawl.

In this case, the load change may occur in the direction of the diameter of the rotating members. However, since the pawl extends along the circumferential direction of the inner rotating member and has a central angle of more than 180°, the spring constant of the pawl is smaller than that of a short pawl which has a central angle of less than 180°, and the stiffness in the swinging direction is small. Thus, when the pawl climbs over the projection, the load change is small in the diameter direction of the rotating members (in the direction of a normal line of the circumference). In addition, since the number of pawls is one and the pawl climbs over the projection only once per rotation of the inner rotating member relative to the outer rotating member, the number of times the load change occurs is smaller than that in the case where there is a plurality of pawls. Thereby, the load change in the diameter direction can be significantly reduced.

The present invention is directed to a camera with a magnetic recording function, comprising: a motor for supplying motive power for feeding photographic film on a frame-by-frame basis for every exposure the photographic film being wound around a spool rotatably provided at a casing of a film cartridge; first driving force transmission means for transmitting driving force of the motor to the spool, and for rotating the spool in a direction to supply the photographic film from the film cartridge when the photographic film is fed forward; a takeup spool for taking up the photographic film supplied from the film cartridge; second driving force transmission means for transmitting driving force of the motor to the takeup spool and for rotating the takeup spool in the same direction as the rotating direction of the spool at a higher speed than a film supplying speed when the photographic film is fed forward; a one way clutch provided on a driving force transmission passage of the first driving force transmission means, the clutch comprising an inner rotating member having a single pawl on an outer peripheral surface thereof, the pawl extending in a circumferential direction of the inner rotating member and having a central angle of more than 180° from a base end thereof to a tip thereof, the tip being elastically swingable in a diametrical direction of the inner rotating member, and an outer rotating member coaxially surrounding the inner rotating member, the outer rotating member having an inner peripheral surface on which the tip of the pawl of the inner rotating member slides and having a projection on the inner peripheral surface, the projection engaging with the tip of the pawl of the inner rotating member only when the inner rotating member rotates relatively to the outer rotating member in a direction from the base end of the pawl to the tip of the pawl; and a magnetic recording means for recording magnetic data relating to photographed frame images onto a magnetic recording layer on the photographic film while the photographic film is fed one frame at a time.

In the camera with the magnetic recording function, the magnetic information is recorded while the film is fed one frame at a time after each exposure the load change in the rotating direction can be controlled when the one way clutch shifts from the engaging state to the disengaging state, and the load change in the diameter direction of rotation while the one way clutch is running idle, so that the film feed speed can be held constant. Thereby, the pitch of the magnetic written signal is constant, and the errors in reading the information can be decreased.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 13(*b*) is a view illustrating an example of the state where the one way clutch is FIG. 7 run idle;

DETAILED DESCRIPTION OF THE PREFERRED EMBODIMENTS

Figure 1:
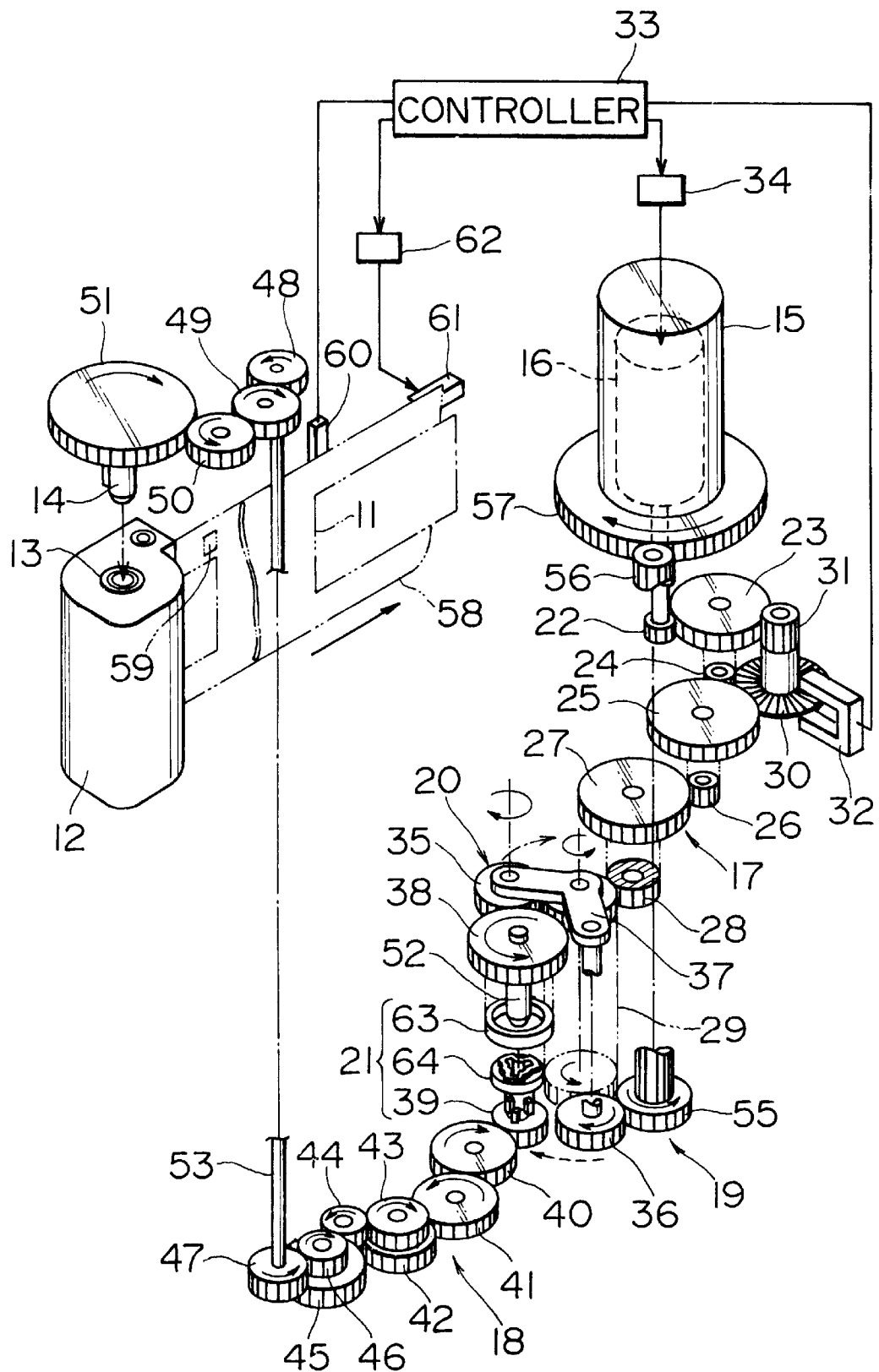
FIG. 1 is a perspective view illustrating a film transporting device of a camera according to the present invention.

FIG. 1 illustrates a film transporting device of a camera according to the present invention. A cartridge chamber is arranged at one side of an aperture 11 and a film takeup chamber is arranged at the other side. A spool driving shaft 14 for coupling with a spool 13 of the cartridge is provided in the cartridge chamber, and a takeup spool 15 around which a rubber sheet is wound is provided in the film takeup chamber.

A gear train between the spool driving shaft 14 and the takeup spool 15 consists of a motor driving force transmission mechanism 17 for transmitting the rotational driving force of a motor 16 which is rotatable both forward and backward, a spool driving force transmission mechanism 18 for transmitting the rotational driving force to the spool driving shaft 14, a takeup spool driving force transmission mechanism 19 for transmitting the rotational driving force to the takeup spool 15, a planet gear mechanism 20 for switching driver and follower of the spool driving force transmission mechanism 18 and the takeup spool driving force transmission mechanism 19, and a one way clutch 21.

The motor 16 is housed in the takeup spool 15. The motor driving force transmission mechanism 17 is composed of a drive gear 22 and gears 23–28, and the gear 23 and 24, the gear 25 and 26, and the gear 27 and 28 are two-step gears which are coaxially integrated. The gear 28 serves as an output gear of the motor driving force transmission mechanism 17 engages with a sun gear 29 of a planet gear mechanism 20. The gear 28 transmits the forward rotational driving force of the motor 16 to the sun gear 29 so as to rotate the sun gear 29 counterclockwise in the drawing when a photographic film 58 is wound.

The gear 23 engages with a gear 31 which is integrated with an encode plate 30. Slits are formed on the encode plate 30 at regular angles, and a photo-interrupter 32 is disposed so that a light projecting part and a light accepting part face each other across the encode plate 30. The photo-interrupter 32 connects to a controller 33 composed of a microcomputer, and transmits a pulse signal to the controller 33 every time the photo-interrupter 32 detects the passage of the slit of the encode plate 30. The controller 33 monitors a cycle of the pulse, and adjusts a timing of magnetic recording according to the cycle so that the recording wavelength can be constant on the magnetic recording layer.

The planet gear mechanism 20 consists of the sun gear 29, a first planet gear 35, a second planet gear 36, and a L-shaped carrier 37. The carrier 37 is constructed in such a manner that a bearing for rotatably supporting the shaft of the sun gear 29 is provided at a central portion thereof and bearings for rotatably supporting the shafts of the first and second planet gears 35 and 36 are respectively provided at both ends. The first and second planet gears 35 and 36 engage with the sun gear 29, and they rotate around the sun gear 29 with their rotational center being the shaft of the sun gear 29. The face of the sun gear 29 is wide in an axial direction, and the second planet gear 38 engages with the sun gear 29 at a position which is lower than the first planet gear 35 by one step.

The spool driving force transmission mechanism 18 is a reducing gear train consisting of a first transmitting gear 38, a second transmitting gear 39, and gears 40–51. The gears 42 and 43, and the gears 45 and 46 are two-step gears. The first transmitting gear 38 and the second transmitting gear 39 are disposed coaxially with each other and rotatably to each other. The one way clutch 21 is incorporated between the first transmitting gear 38 and the second transmitting gear 39, and it transmits the driving force in one rotational direction from one gear to another.

The gear train from the first transmitting gears 38 to the gear 47 is arranged at the bottom of the camera body, and the gear train from the gear 48 to the gear 51 is arranged at the top of the camera body. The gears 47 and 48 between these two gear trains are connected to each other by a connecting shaft 53 which is arranged at the outside of the cartridge chamber. The spool driving shaft 14 is integrated with the bottom of the spool gear 51, and it projects to the inside of the cartridge chamber. When the cartridge 12 is mounted, the spool driving shaft 14 is smoothly coupled to the spool 13.

The takeup spool driving force transmission mechanism 19 is a reducing gear train consisting of a third transmitting gear 55, a gear 56 and a takeup spool gear 57, and the third transmitting gear 55 and the gear 56 are two-step gear. The takeup spool gear 57 is integrated with the outer circumference of the lower part of the takeup spool 15.

When the film 58 is wound, the forward rotational driving force of the motor 16 is supplied to the sun gear 29, and the sun gear 29 rotates counterclockwise. When the sun gear 29 rotates counterclockwise, the carrier 37 rotates counterclockwise to reach a winding position where the first and second planet gear 35 and 36 can engage with the first and third transmitting gear 38 and 55, respectively. Thereby, the spool driving shaft 14 is driven in a film supplying direction, and the takeup spool 15 is driven in a film winding direction. When the film 58 is rewound, the backward rotational driving force of the motor 16 is supplied to the sun gear 29, and the carrier 37 rotates clockwise to reach a rewinding position where the first planet gear 35 disengages from the first transmitting gear 38, and the second planet gear 36 disengages from the third transmitting gear 55 to engage with the second transmitting gear 39. Thereby, the takeup spool 15 becomes free, and only the spool driving shaft 14 is driven in a film rewinding direction.

Two adjacent perforations 59 are spaced out at regular intervals at one edge of the film 58 in an effective exposure range between a leader and a trailer so that the positions of frames subject to photographing can be indexed. A perforation sensor 60 is arranged to face the aperture 11 across a film passage in the camera body. The perforation sensor 60 connects to the controller 33, and it optically detects the passage of the perforation sensors 59. A magnetic head 61 is arranged at the same side as the perforation sensor 60. The magnetic head 61 connects to the controller 33 via a magnetic head driver 62. While the film 58 is fed on a frame-by-frame basis, the magnetic head 61 records the photographic information and the print information, etc. relating to each frame subject to photographing at positions corresponding to each frame onto a transparent magnetic recording layer coating on the reverse side of the emulsion face of the film 58.

Figure 2:
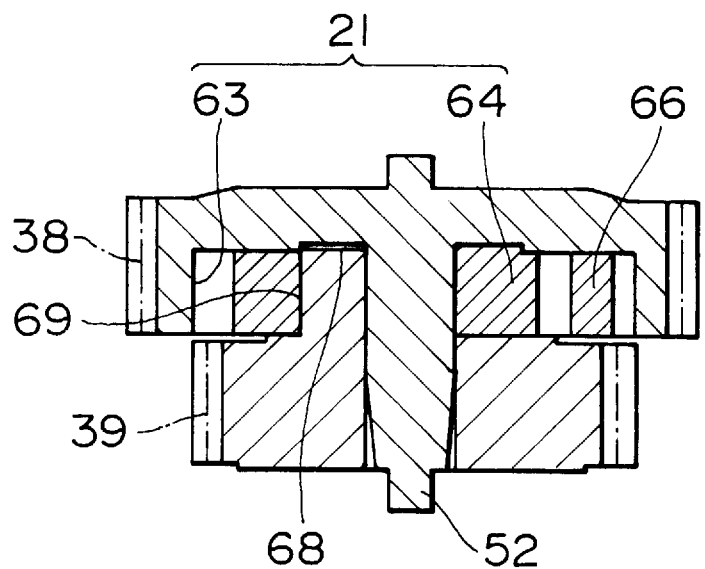
FIG. 2 is a longitudinal sectional view illustrating the details of a clutch in the film transporting device in FIG. 1.
Figure 3:
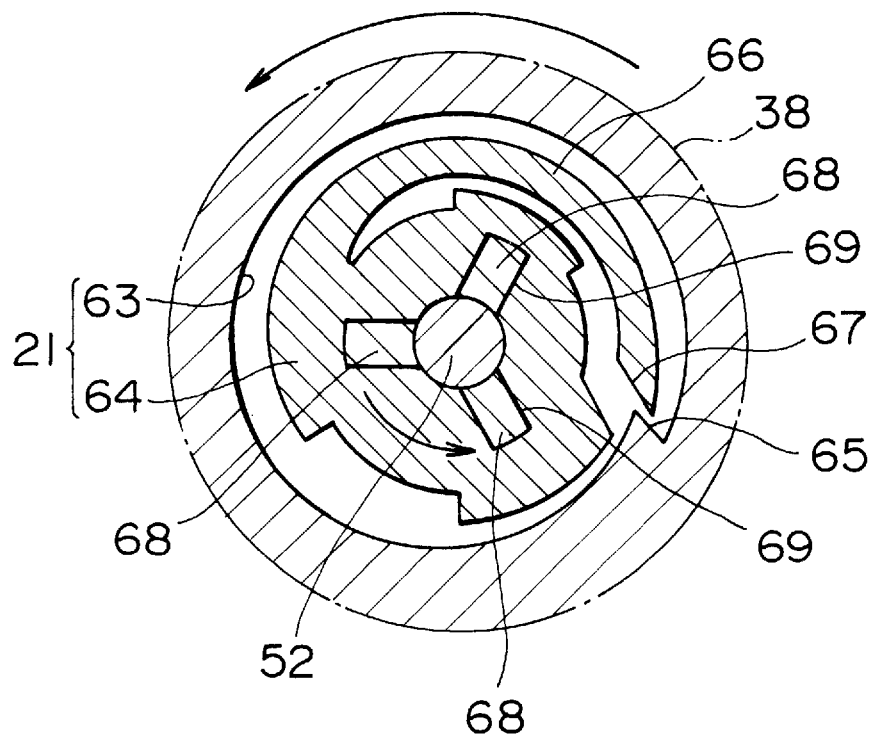
FIG. 3 is a transverse cross section illustrating the details of the clutch in the film transporting device in FIG. 1.

As indicated in FIGS. 2 and 3, the one way clutch 21 consists of an outer rotating member 63 integrated with the first transmitting gear 38 of which bottom is sunken, and an inner rotating member 64 which is supported to be axially rotatable in the outer rotating member 63. A step is provided at a sharp angle at one part of the inner surface of the outer rotating member 63, and the step is an inner projection 65.

The inner rotating member 64 is provided with an arm 66 of which outer circumference is cut to be elastic, and a pawl 67 for engaging with the inner projection 65 is formed at the end of the arm 66. The inner rotating member 64 is provided with a hole 69 which is engaged with three projections 68 of the second transmitting gear 39. The inner rotating member 64 and the second transmitting gear 39 rotate about a shaft 52 of the first transmitting gear 38 in one united body. The number of the inner projection 65 is not necessarily one, and a plurality of the inner projections 65 may be provided. If a plurality of the inner projections 65 are provided, a plurality of arms 66 with the pawls 67 at the end thereof are preferably provided. Moreover, the inner projection 65 and the pawl 67 may be shaped freely if they can engage with each other to transmit the driving force.

When the forward rotational driving force of the motor 16 is transmitted to the first transmitting gear 36, the inner projection 65 rotates counterclockwise as indicated in FIG. 3 (in the direction of the arrow). The inner rotating member 64 is arranged such that the pawl 67 engages with the inner projection 65 which rotates counterclockwise. The inner rotating member 64 engages with the inner projection 65 at the driver side and rotates with the inner projection 65 until the takeup spool 15 takes up the film 58. When the takeup spool 15 takes up the film 58, the inner rotating member 64 rotates faster than the inner projection 65, and thereby the inner projection 65 disengages from the pawl 67.

Figure 4:
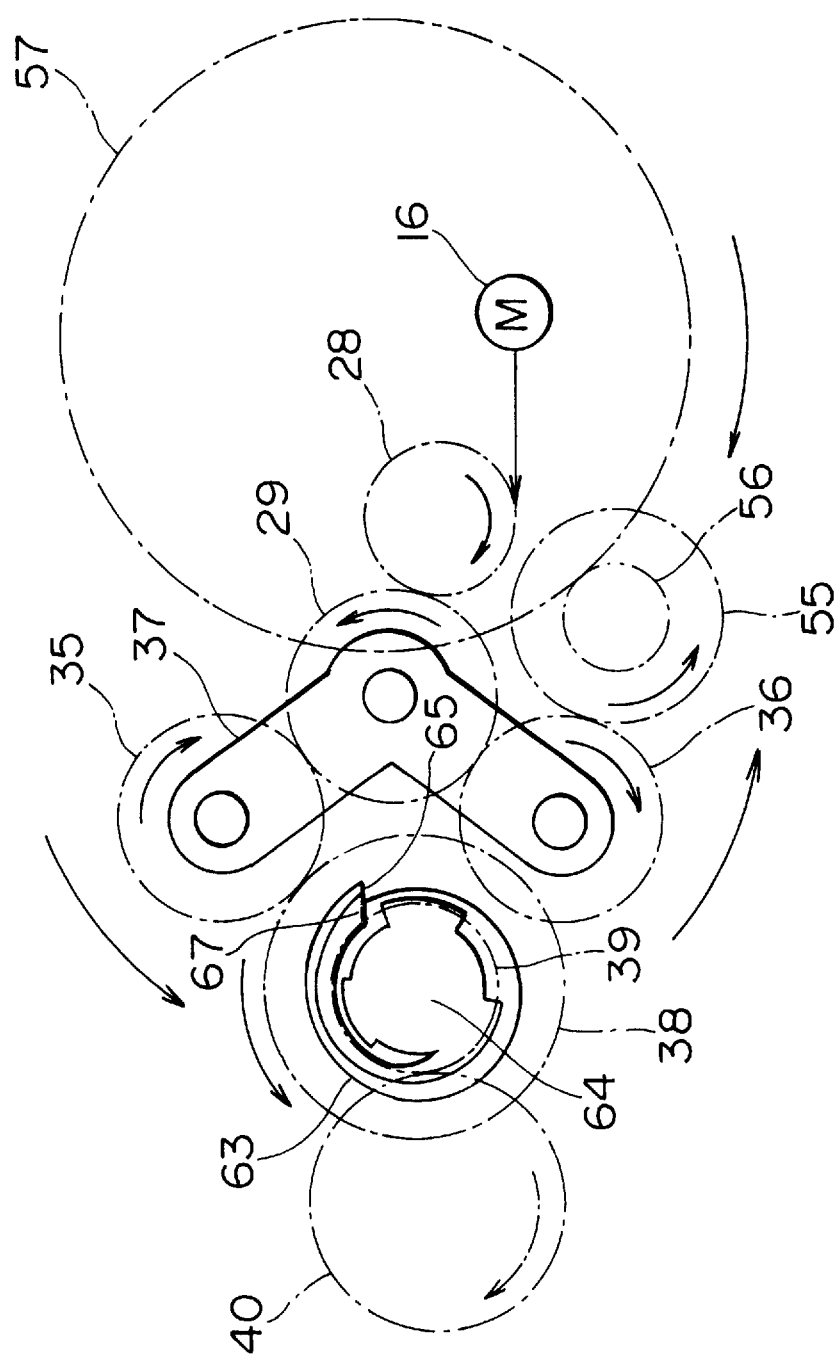
FIG. 4 is a view describing the essential parts of the film transporting device when the film is wound.

The operation of the above-stated structure will hereunder be explained. After the cartridge 12 is housed in the cartridge chamber, the controller 33 initially winds the film 58 by rotating the motor 16 forward by the motor driver 34. When the motor 16 rotates forward, the sun gear 29 rotates counterclockwise via the motor driving force transmission mechanism 17 as indicated in FIG. 4. Thereby, the carrier 37 rotates counterclockwise, and the first planet gear 35 engages with the first transmitting gear 38. Thus, the inner projection 65 rotates counterclockwise as indicated in FIG. 3, and the inner projection 65 abuts against the pawl 67 of the inner rotating member 64. In this case, since the stationary pawl 67 is suddenly connected to the rotating inner projection 65 in an instant, the great impact force is applied to the pawl 67. The arm 66, however, elastically deforms to absorb the impact force, so that the pawl 67 can be smoothly connected to the inner projection 65. Moreover, because the inner projection 65 engages with the pawl 67 in such a way that the arm 66 can swing toward the outer circumference, the elastic deformation of the arm 66 is regulated by the inner peripheral surface of the outer rotating member 63. Thereby, the arm 66 is not damaged, and it can be used for a long time.

When the inner projection 65 engages with the pawl 67, the driving force of the motor 16 is transmitted from the first transmitting gear 38 to the second transmitting gear 39. Thereby, the spool driving shaft 14 rotates in the film supplying direction (clockwise as indicated in FIG. 1). On the other hand, the second planet gear 36 engages with the third transmitting gear 55, and the driving force of the motor 16 is transmitted to the takeup spool driving force transmission mechanism 19. Thereby, the takeup spool 15 rotates in the film winding direction (clockwise as indicated in FIG. 1).

When the spool driving shaft 14 drives the spool 13 in the film supplying direction, the supplying of the film 58 starts, and the film leader is transported toward the takeup spool 15 via the film passage in the camera. When the film leader reaches the area in a close proximity to the outer circumference of the takeup spool 15, the film leader is guided along the outer circumference of the takeup spool 15 by the operation of a film holding roller, etc. provided around the takeup spool 15. The takeup spool 15 has already started rotating in the film winding direction, the film leader which is transported as stated above is immediately wound onto the takeup spool 15. After the film 58 is wound around the takeup spool 15 by about one turn, the film 58 is drawn by the driving of the takeup spool 15.

When the perforation sensor 60 detects the perforation 59 of the first frame while the film 58 is wound initially, the controller 33 stops the forward rotational driving of the motor 16, and sets the first frame at the aperture 11. Thereafter, the film 58 is fed on a frame-by-frame basis in the above-mentioned manner for every exposure.

The film 58 is loosened in the cartridge 12 until the film leader is wound onto the takeup spool 15. After several frames on the film 58 are exposed, the film 58 is tightened. The circumferential speed of the takeup spool 15 is set to be 1.5 to 2 times as high as the film supplying speed in order to catch the film leader without fail. Thus, the second transmitting gear 39 at the follower side rotates faster than the first transmitting gear 38 at the driver side, and the pawl 67 of the inner rotating member 64 disengages from the inner projection 65, and the driving force is not transmitted from the motor driving force transmission mechanism 17 to the spool driving force transmission mechanism 18. The pawl 67 smoothly disengages from the inner projection 65 without a shock, due to the operation when the arm 66 returns to the original state. After the one way clutch 21 disengages, the spool 13 rotates following the transport of the film 58.

While the film 58 is fed by one frame, the magnetic head 61 performs the magnetic recording. During the magnetic recording, the controller 33 monitors the cycle of the pulse signal transmitted from the photo-interrupter 32, and the magnetic recording is performed by adjusting the timing of the magnetic recording in accordance with the cycle. During this operation, if the load change occurs between the inner projection 65 and the pawl 67 because the inner projection 65 abuts against the pawl 67 or the inner projection 65 removes from the pawl 67, the film transport speed is difficult to hold constant. However, since the load change is absorbed by the elastic deformation of the arm 66, the load change is not transmitted to the transport of the film 58, and thus, the film 58 can be smoothly transported.

Figure 5:
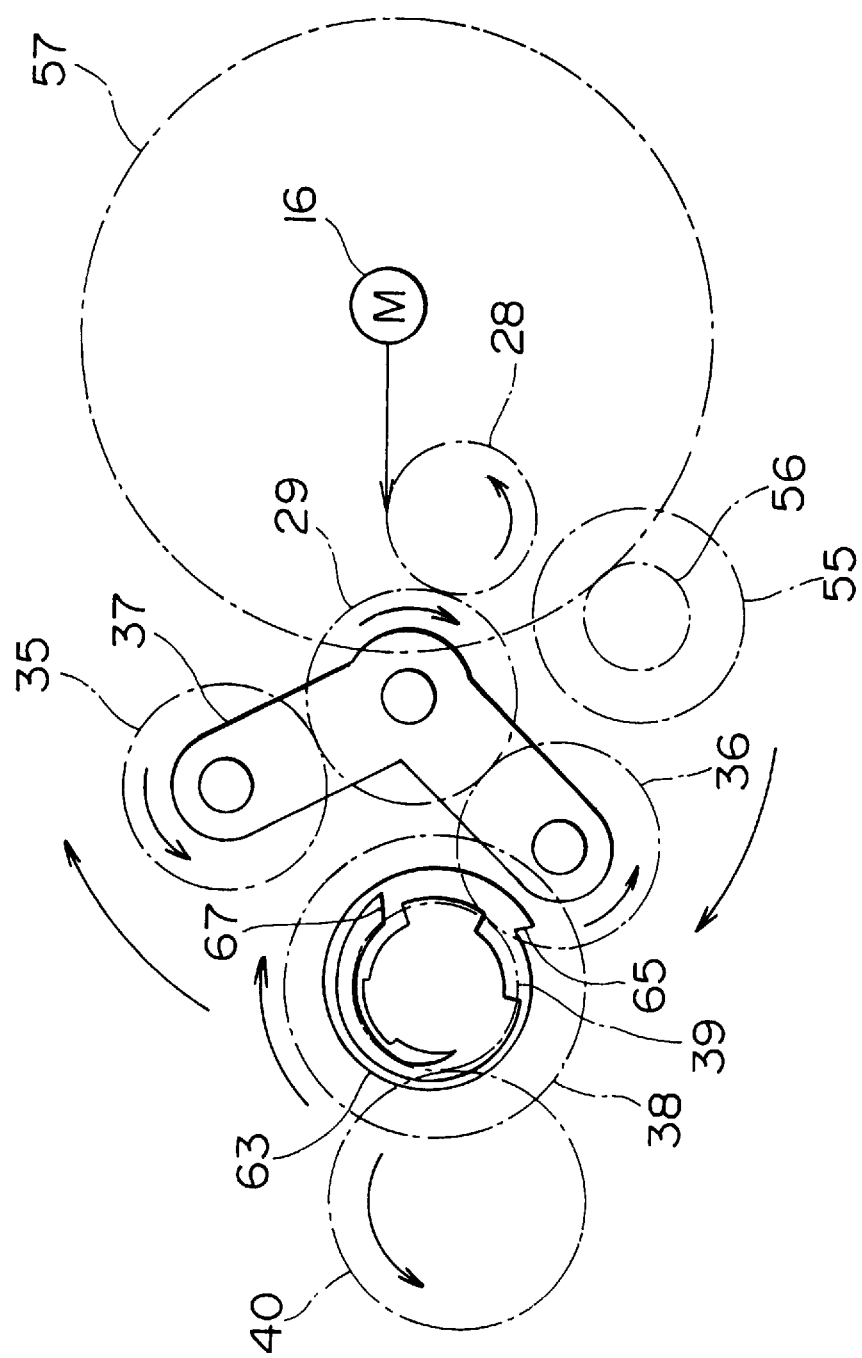
FIG. 5 is a view describing the essential parts of the film transporting device when the film is rewound.

After all frames are exposed, the forward rotational driving of the motor 16 is stopped, and then the backward rotational driving of the motor 16 starts. Thereby, the sun gear 29 rotates clockwise about the shaft of the sun gear 29 as indicated in FIG. 5, and the carrier 37 moves to the rewinding position. When the carrier 37 moves to the rewinding position, the second planet gear 36 disengages from the third transmitting gear 55 to engage with the second transmitting gear 39. In this case, the first planet gear 35 disengages from the first transmitting gear 38, and the takeup spool 15 becomes free. The second planet gear 36 rotates the second transmitting gear 39 in a direction reverse to the film winding direction, that is, clockwise.

When the second transmitting gear 39 rotates clockwise, the spool driving shaft 14 is driven in the film rewinding direction via the spool driving force transmission mechanism 18. Thereby, the exposed photographic film 58 is pulled into the cartridge 12 while it is taken up by the spool 13. During this operation, the takeup spool 15 rotates following the rewinding of the film 58. The first and second transmitting gears 38 and 39 transmit the driving force to the spool driving shaft 14 via the one way clutch 21 when the film 58 is supplied, and the gears 38 and 39 transmit the driving force in the reverse direction to the spool driving shaft 14, not though the one way clutch 21 when the film 58 is rewound.

When the second transmitting gear 39 rotates clockwise, the pawl 67 of the inner rotating member 64 abuts against the inner projection 65 to rotate the first transmitting gear 38 clockwise. Because the first transmitting gear 38 disengages from the first planet gear 35, there is no problem if the first rotating gear 38 rotates.

The controller 33 detects, as the time of completion of rewinding, the moment when the film 58 has been rewound for a predetermined time since the perforation sensor 60 detects that there is no film, and at this time, the controller 33 stops the driving of the motor 16. Thereafter, the cartridge 12 is removed from the cartridge chamber. The cartridge 12 containing the exposed photographic film 58 is brought to a processing laboratory. At the processing laboratory, the film 58 is removed from the cartridge 12, and a developing machine develops the film 58. The developed photographic film 58 is set in a photo printer, so that each frame can be printed. In this case, the print information, the photographic information, etc. which are magnetically recorded correspondingly to each frame are read. Since the recording wavelength is uniform, reading errors can be avoided while the information is read.

Figure 6:
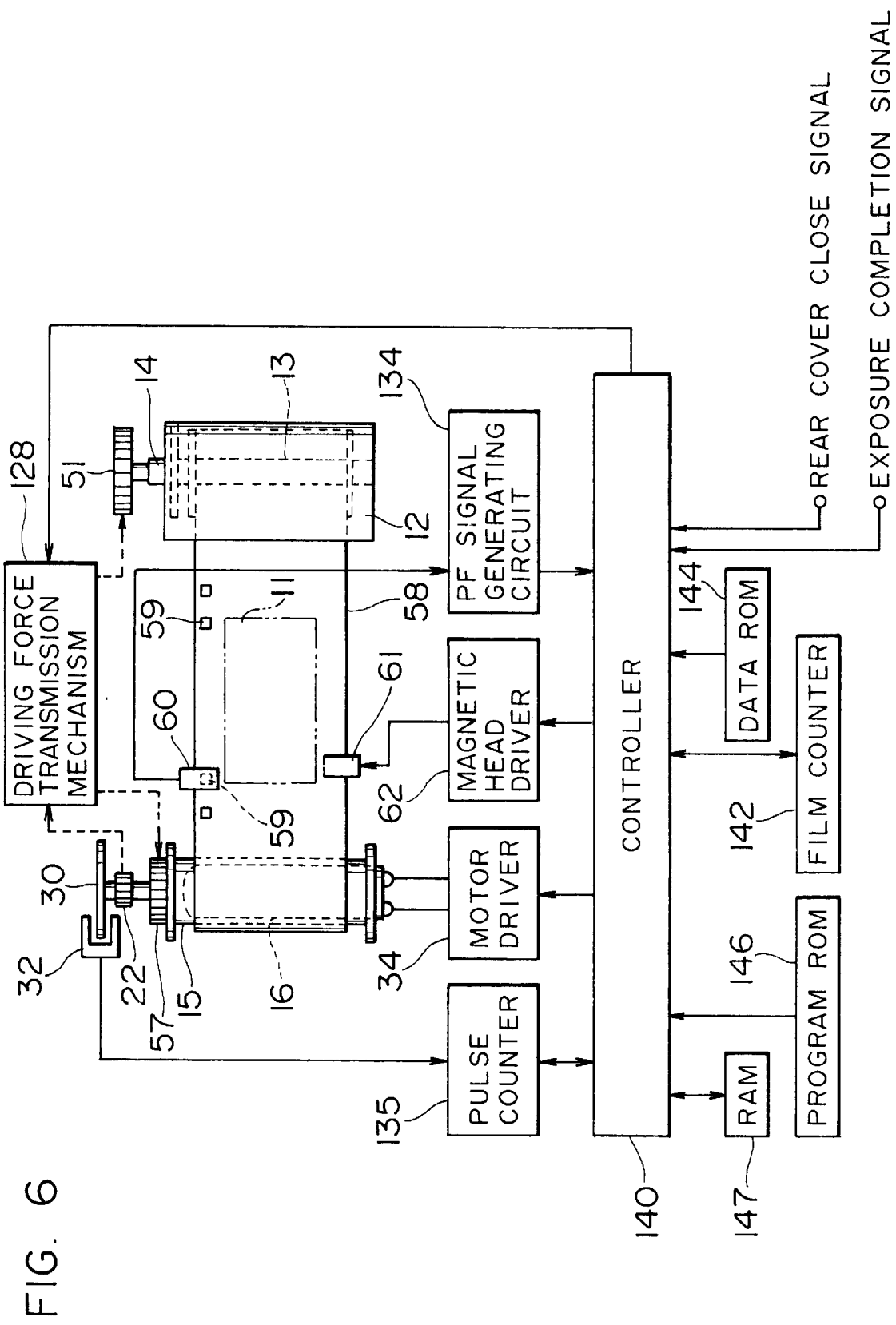
FIG. 6 is a block diagram illustrating the essential parts of an embodiment of a camera with a magnetic recording function according to the present invention.

FIG. 6 is a block diagram illustrating the essential parts of an embodiment of the camera with the magnetic recording function according to the present invention. The camera with the magnetic recording function is composed mainly of the film transporting device consisting of the spool driving shaft 14, the takeup spool 15, the motor 16, a driving force transmission mechanism 128, etc.; a magnetic recording device consisting of the magnetic head 30, the magnetic head driver 62, etc.; and a controller 140 consisting of a microcomputer which controls the film transporting device and the magnetic recording device. Parts similar to those described with reference to FIG. 1 are denoted by the same reference numerals, and they will not be explained in detail.

The driving force is transmitted from the motor 16 to the driving force transmission mechanism 128, which transmits the driving force to the spool driving shaft 14 and the takeup spool 15. The driving force transmission mechanism 128 switches the driving force of the motor 16 for winding and rewinding the film 58 in accordance with the rotating direction of the motor 16.

The driving force transmission mechanism 128 transmits the driving force in the same manner as the mechanism illustrated in FIG. 1, and it has a planet gear mechanism 114 and a one way clutch 116, which will be described in detail later. When the film 58 is normally fed frame-by-frame during photography, the driving force transmission mechanism 128 is switched to be suitable for winding the film 58. When the motor 16 is rotated forward by the input of a signal indicating that the exposure of one frame has been completed, the forward rotation is transmitted to the spool driving shaft 14, which drives the spool 13 of the cartridge 12, via the driving gear 22, the driving force transmission mechanism 128 and the spool gear 51.

There is provided the perforation sensor 60 in the transport route of the film 58, that is, above the frame of the aperture 11 of the camera. The perforation sensor 60 detects the perforations 59 which are punched at the edge of the film correspondingly to the position of each frame. The perforation sensor 60 is composed of, for example, a reflexive photo-sensor consisting of an LED which emits infrared light and a photo-transistor which receives the reflexive light, and the perforation sensor 60 outputs a photoelectric signal corresponding to the intensity of the reflexive light received by the photo-transistor. The photoelectric signal from the perforation sensor 60 is sent to a perforation signal (PF signal) generating circuit 134.

The PF signal generating circuit 134 converts the photoelectric signal from the perforation sensor 60 into a binary PF signal. The PF signal generating circuit 134 generates a low (L) level PF signal when the perforation sensor 60 faces the perforation 59, and generates a high (H) level PF signal in other cases. The PF signal is sent to the controller 140.

A film counter 142 connects to the controller 140. Every time the perforation sensor 60 detects the perforation and the PF signal becomes L level from the H level, the film counter 142 increments its count value one by one. When the controller 140 receives a rear cover close signal which is generated when the cartridge 12 is mounted and a rear cover of the camera is closed, the film counter 142 is reset so that the count value can be "0". The count value of the film counter 142 is sent to the controller 140 as information indicating where the frame set in the aperture 11 ranks in the frames on the film 58.

A rotary encoder is attached to the motor 16. The rotary encoder consists of the encode plate 30 which is constructed such that the slits are radially formed at regular intervals on the disc rotating with the rotational shaft of the motor 16, and the photo-interrupter 32 composed of the light projecting part and the light accepting part which face each other across the encode plate 30. Every time the slit passes between the light projecting part and the light accepting part, the photo-interrupter 32 generates an encode pulse.

Since the encode plate 30 rotates with the rotational shaft of the motor 16, the encode pulse is generated every time the motor 16 rotates by a predetermined angle. A pulse counter 135 counts the number of the encode pulses. Every time the encode pulse is input, the pulse counter 135 increments its count value one by one, and the count value of the pulse counter 135 is sent to the controller 140. The controller 140 measures the feed length of the film 58 in accordance with the count value, and resets the count value to be "0".

The magnetic head 61 is supported by a film pressure plate (not shown) for example below the aperture 11 of the camera, such that the magnetic head 61 can contact the magnetic recording layer at the edge of the back of the film 58. The magnetic head 61 is arranged at a distance of a predetermined length away from the perforation sensor 60 toward the cartridge 12 (at the upstream side of the film winding direction) in the transport direction.

The magnetic head driver 62 drives the magnetic head 62, which records the photographic information output from the controller 140 as a digitized magnetic signal in a binary code onto the magnetic recording layer of the corresponding frame on the film 58 while the film 58 is fed by one frame after an exposure. The photographic information recorded onto the magnetic recording layer on the film 58 is exposure control data, etc. such as the photographing date, the shutter speed and the f-stop value.

The controller 140 connects to a data read only memory (ROM) 144 which contains a variety of exposure data as binary codes. The binary code corresponding to the exposure controlling data at the time of photographing is picked up from the data ROM 144 when the exposure is completed, and the binary code is sent to the magnetic head driver 62. The magnetic head driver 62 drives the magnetic head 61 according to the binary code. That is, the controller 140 calculates the film transport speed during the magnetic recording in accordance with the encode pulse signal of the rotary encoder. The magnetic head 61 is driven in a timing corresponding to the film transport speed. Thereby, the length of each bit in the binary code, which is magnetically recorded onto the magnetic recording layer on the film, is maintained uniform.

The controller 140 connects to a program ROM 146 and a random access memory (RAM) 147. The program ROM 146 contains a program for executing a photographing sequence and a magnetic recording sequence, and the like. The RAM 147 serves as a work area for temporarily memorizing the data required for executing the photographing sequence and the magnetic recording sequence.

Next, the film transporting device will be explained.

Figure 7:
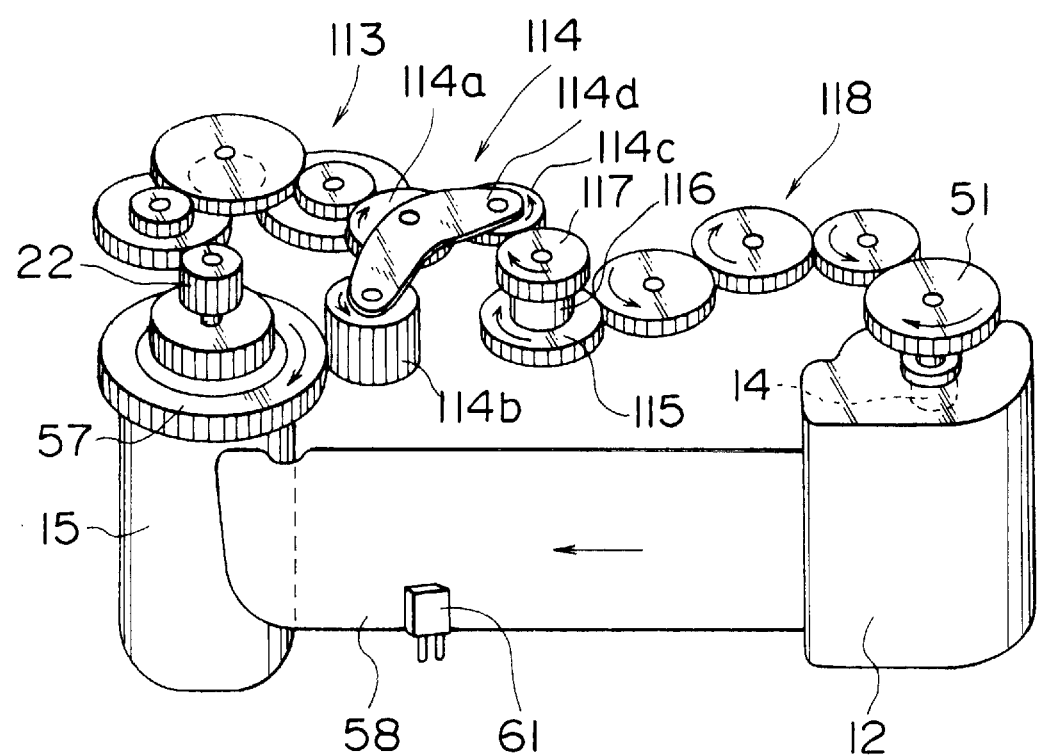
FIG. 7 is a perspective view illustrating the state of the film which is initially supplied by a driving force transmission mechanism in FIG. 6.
Figure 8:
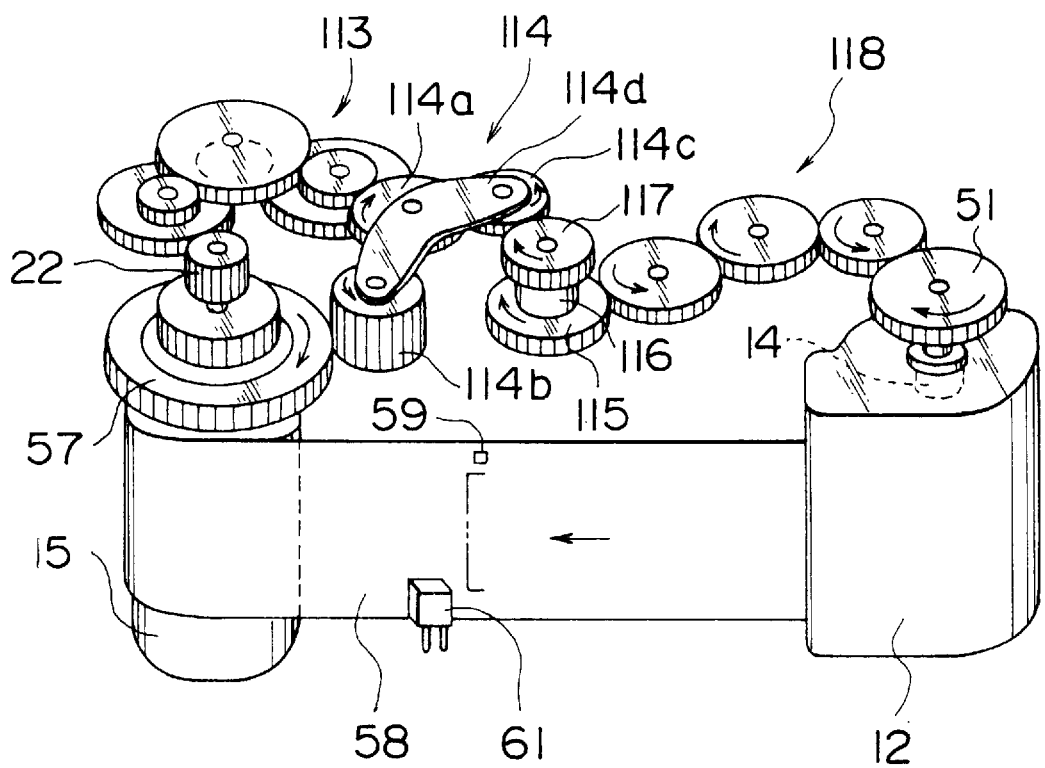
FIG. 8 is a perspective view illustrating the state of the film which is wound one frame by the driving force transmission mechanism in FIG. 6.
Figure 9:
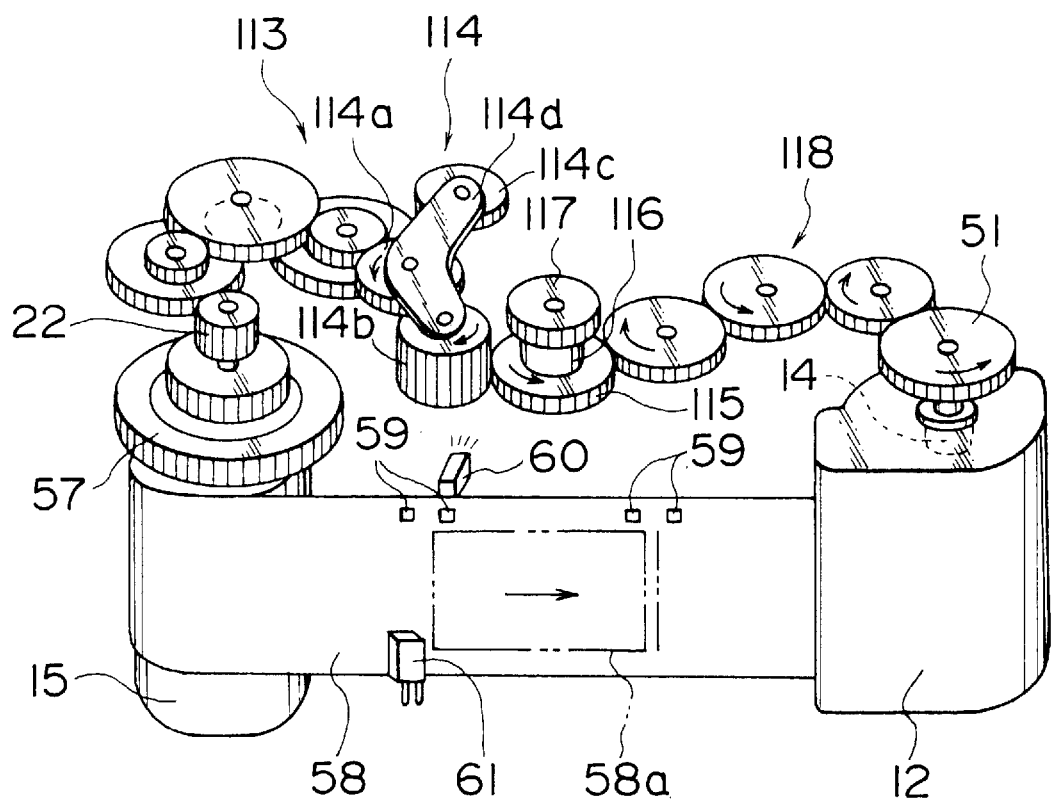
FIG. 9 is a perspective view illustrating the film which is rewound by the driving force transmission mechanism in FIG. 6.

FIGS. 7, 8 and 9 are perspective views illustrating the state of each operation of the driving force transmission mechanism 128 shown in FIG. 6.

The motor 16 is built in the takeup spool 15 (see FIG. 6), and the driving gear 22 is mounted on the output shaft of the motor 16. The driving gear 22 connects to a sun gear 114a of the planet gear mechanism 114 via a gear train 113 having an appropriate gear ratio. The planet gear mechanism 114 has a first planet gear 114b and the second planet gear 114c which engages with the sun gear 114a. The sun gear 114a, the first planet gear 114b and the second planet gear 114c are supported by a substantially L-shaped carrier 114d. When the carrier 114d swings in the rotating direction of the sun gear 114a, the first planet gear 114b engages with the takeup spool gear 57, which is formed on the outer peripheral surface of the upper part of the takeup spool 15, or a spool driving first gear 115. When the first planet gear 114b engages with the takeup spool gear 57, the second planet gear 114c engages with a film supplying gear 117 which is coaxial with the spool driving first gear 115 via the one way clutch 116. The structure of the one way clutch 116 will be described later.

The spool gear 51 connects to the spool driving first gear 115 via a spool driving gear train 118 having an appropriate gear ratio. The spool driving shaft 14 is secured to the spool gear 51, and the spool driving shaft 14 projects into the cartridge chamber (not shown). The spool driving shaft 14 is coupled to the spool 13 (see FIGS. 10 and 11) of the cartridge 12 housed in the cartridge chamber. The driving force transmission mechanism 128 in FIG. 6 consists of the gear train 113, the planet gear mechanism 114, the spool driving first gear 115, the one way clutch 116, the film supplying gear 117 and the spool driving gear train 118.

In order to mount the cartridge 12 in the cartridge chamber, the cover formed at the bottom of the camera body (not shown) is opened. When the cartridge 12 is mounted in the cartridge chamber, the spool 13 is coupled to the spool driving shaft 14.

Figure 10:
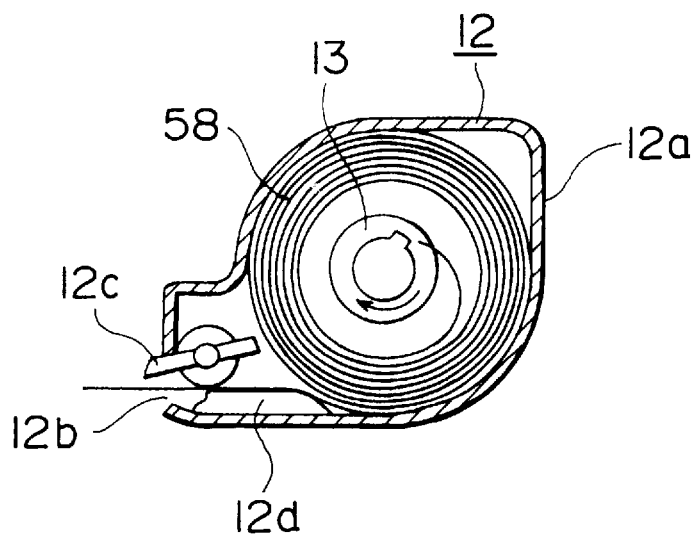
FIG. 10 is a central transverse sectional view of a film cartridge mounted in the camera, illustrating the state where the film is loosely wound when the film is initially supplied.
Figure 11:
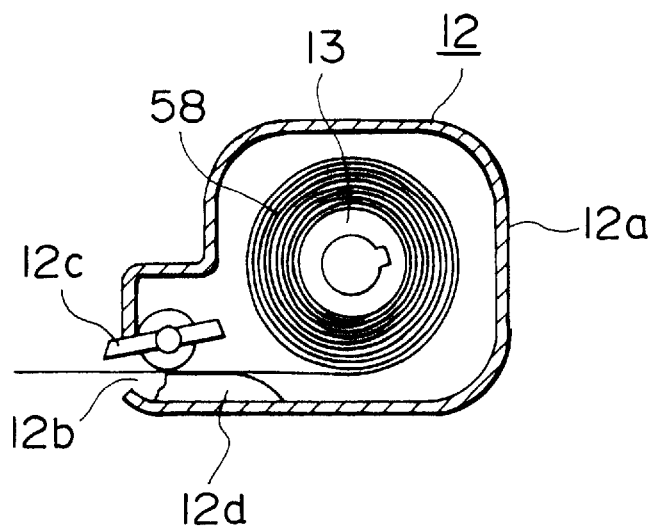
FIG. 11 is a central transverse sectional view of the film cartridge mounted in the camera, illustrating the state where the film is tightly wound after the film is initially supplied.

As depicted in FIGS. 10 and 11, one end of the film 58 is fixed to the spool 13 which is rotatably supported at the center of a cylindrical casing 12a, and the film 58 is wound around the spool 13. An opening 12b is formed at one part of the casing 12a, and the longitudinal direction of the opening 12b is parallel to the spool 13. An openable light-shielding door 12c is provided at the opening 12b. A film guide part 12d is formed in a proximity to the opening 12b in order to guide the leader of the film 58 toward the opening 12b. One part of the casing 12a swells inward to form the film guide part 12d. When the cartridge 12 is not mounted in the camera, the whole roll film 58 is housed in the casing 12a, and the leader of the film 58 does not project from the opening 12b. The light-shielding door 12c is closed when the cartridge 12 is not mounted in the camera. When the cartridge 12 is mounted in the camera, the light-shielding door 12c is opened by the mechanism in the camera.

The film 58 which is pulled out the cartridge 12 while mounted in the camera is taken up by the takeup spool 15, and the film 58 is stretched between the takeup spool 15 and the cartridge 12. The aperture 11 (see FIG. 6) is formed halfway between the takeup spool 15 and the cartridge chamber, and a frame 58a on the film 58 is set in the aperture 11, so that the set frame 58a can be exposed.

Next, the operation of the film transporting device constructed in the above-mentioned manner will be explained.

When the cartridge 12 is mounted in the cartridge chamber, the film 58 is fed initially. That is, the controller 140 sends a signal to the motor driver 34 so as to rotate the motor 16 in a direction to wind the film 58 (hereinafter referred to as a forward rotating direction), so that the motor 16 can rotate forward.

When the motor 16 rotates as shown in FIG. 7 and the rotation is transmitted to the sun gear 114a of the planet gear mechanism 114, the carrier 114d swings in the rotating direction of the sun gear 114a by the frictional force generated between the sun gear 114a and the carrier 114d. The first planet gear 114b engages with the takeup spool gear 57, and the second planet gear 114c engages with the film supplying gear 117. Thereby, the rotation of the motor 16 is transmitted to the takeup spool 15 via the first planet gear 114b, so that the takeup spool 15 can be rotated in a direction to take up the film 58. The rotation of the motor 16 is sequentially transmitted via the second planet gear 114c to the film supplying gear 117, the one way clutch 116, the spool driving first gear 115, and the spool driving gear train 118 so as to rotate the spool gear 51. Thus, the spool 13 of the cartridge 12 engaged with the spool gear 51 rotates in the direction to supply the film.

The film 58 wound around the spool 13 is turned clockwise in FIG. 10, that is, in the direction to supply the film 58, by the rotation of the spool 13. Thus, the film 58 is gradually unwound to be pressed against the inner wall of the casing 12a of the cartridge 12, and the film 58 turns along the inner wall. When the leader of the film 58 abuts against the film guide part 12d while the film 58 is turning, the leader advances toward the opening 12b, and the leader leaves the casing 12a through the opening 12b. Further, the film 58 is pushed out of the casing 12a by the rotation of the spool 13, and the leader of the film 58 is guided by a film rail (not shown), which is formed at the edge of the aperture 11, to reach the takeup spool 15.

As shown in FIG. 8, the takeup spool 15 rotates in the direction to wind the film 58. When the film 58 reaches the takeup spool 15, the film 58 is taken up by the rotation of the takeup spool 15. Since the rotating speed of the takeup spool 15 is higher than that of the spool 13, the film 58 is pulled out of the cartridge 12 by the rotation of the takeup spool 15.

When the film 58 is wound, the film 58 is transported until the first frame is set in the aperture 11 by means of the perforation 59 on the film 58, which is detected by the perforation sensor 60. The transport direction of the film 58 will be referred to as a forward direction.

When the first frame is set, the motor 16 is braked electrically or mechanically to stop. Thereafter, when the photographing of the first frame is completed, the film 58 is automatically fed in the forward direction by one frame. While the film is fed one frame at a time, the magnetic head 61 records the photographic information as a digitized magnetic signal onto the magnetic recording layer of the frame subject to photographing on the film 58.

As the photographing proceeds as stated above, the film 58, which is wound within loosely the casing 12a, is wound tightly because the rotating speed of the takeup spool 15 is higher than that of the spool 13. When the film 58 is wound tightly to a sufficient extent as shown in FIG. 11, the rotating speed of the spool driving first gear 115 is higher than that of the film supplying gear 117, and the one way clutch 116 disengages.

On the other hand, when the photographing of all frames is completed, the motor 16 is reversed. Thus, the sun gear 114a of the planet gear mechanism 114 rotates in a reverse direction, the carrier 114d swings in this direction, so that the first planet gear 114b disengages from the takeup spool gear 57 and engages with the spool driving first gear 115 as shown in FIG. 9. Thereby, the rotation of the motor 16 is transmitted from the spool driving first gear 115 to the spool gear 51 via the spool driving gear train 118. Thus, the spool 13 rotates counterclockwise in FIG. 11, that is, in the direction to rewind the film 58. The film 58 is rewound by the rotation of the spool 13. In this case, the takeup spool 15 is freely rotatable.

Next, the structure of the one way clutch 116 will be explained.

Figure 12:
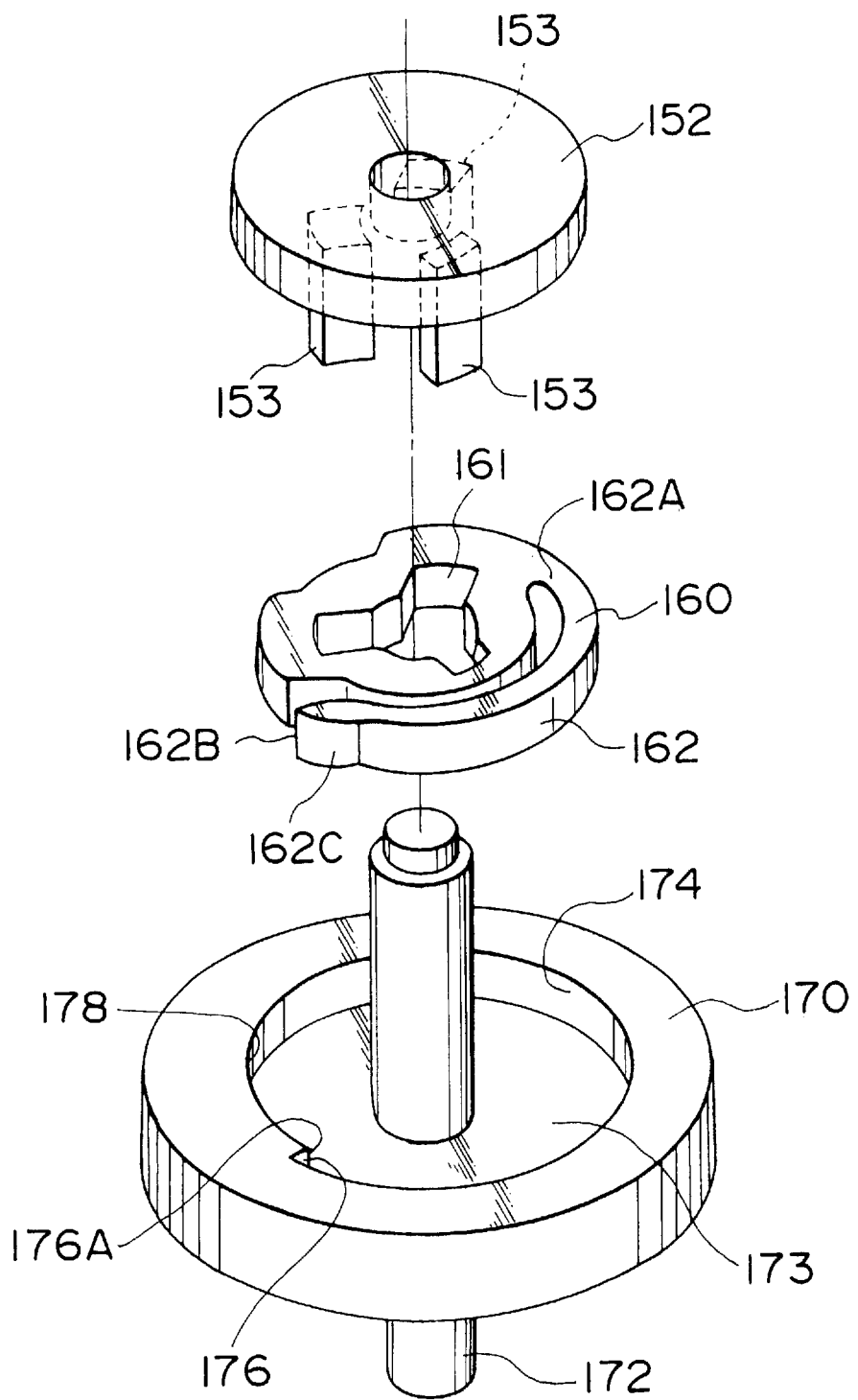
FIG. 12 is a view describing the inner structure of the one way clutch in FIG. 7.

FIG. 12 illustrates the inner structure of the one way clutch. As shown in FIG. 12, the one way clutch 116 consists of a driving gear 152 (equivalent to the film supplying gear 117 in FIG. 7) which is rotated by the rotating force from the motor 16, a clutch plate 160 which rotates unitedly with the driving gear 152, and a driven gear 170 (equivalent to the spool driving first gear 115 in FIG. 7). A shaft 172 is integrated with the rotational center of the driven gear 170, and the driving gear 152 and the clutch plate 160 are rotatably supported by the shaft 172.

Three projections 153 are formed around the rotational center of the driving gear 152. The clutch plate 160 is disposed coaxially with the driving gear 152, and a hole 161 having a shape corresponding to the shape of the projections 153 is punched in the clutch plate 160. The projections 153 of the driving gear 152 engage with the hole 161 so that the driving gear 152 and the clutch plate 160 can rotate in one united body.

Figure 13A:
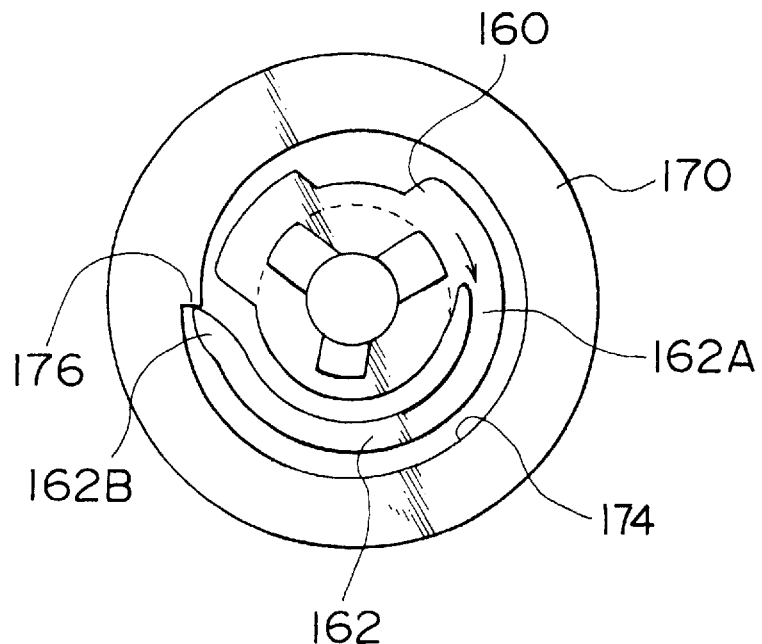
FIG. 13(*a*) is a view illustrating the state where the one way clutch is FIG. 7 engages.
Figure 13B:
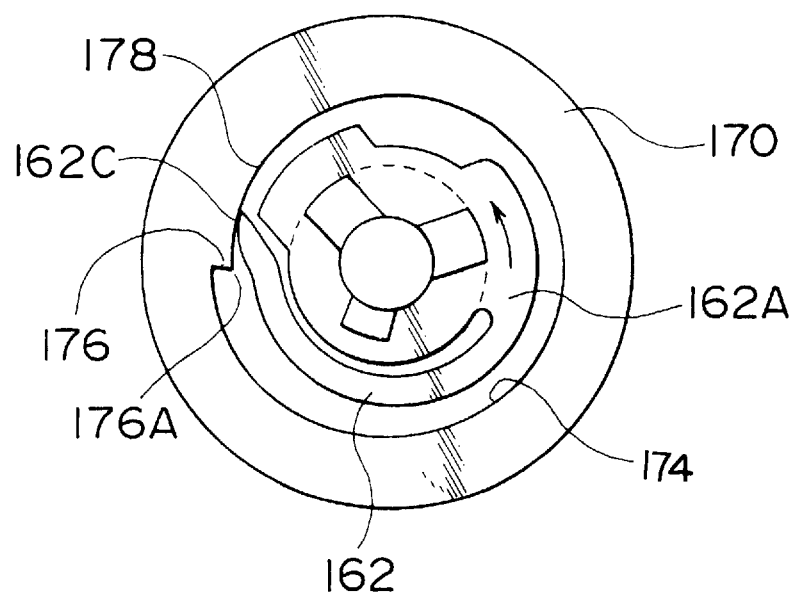
Figure 14:
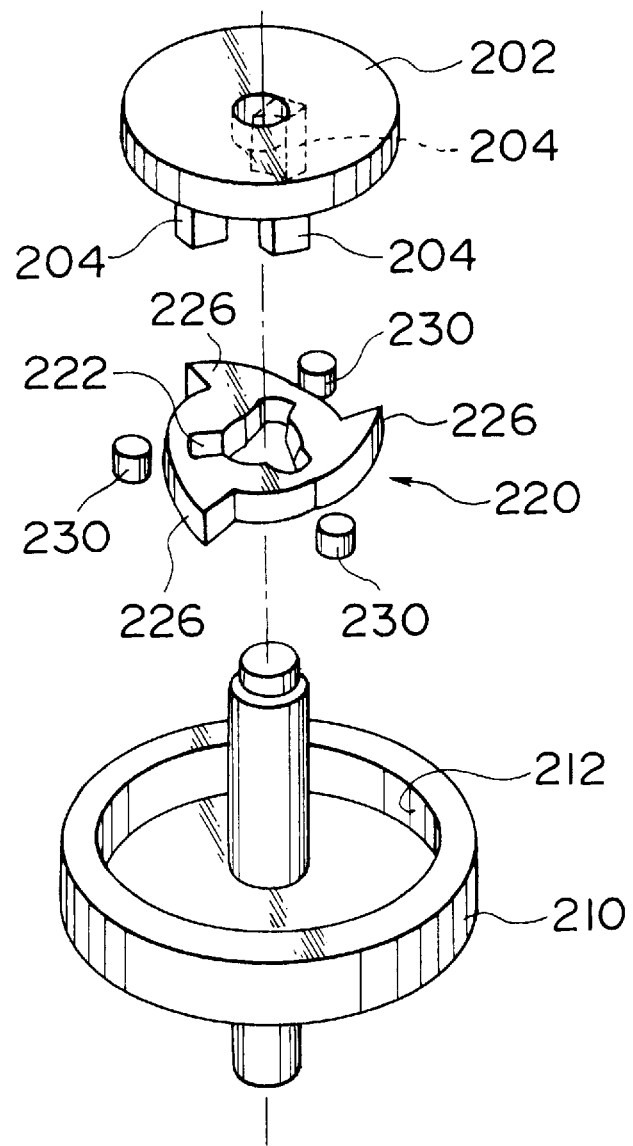
FIG. 14 is a view describing an example of the inner structure of a conventional one way clutch.
Figure 15:
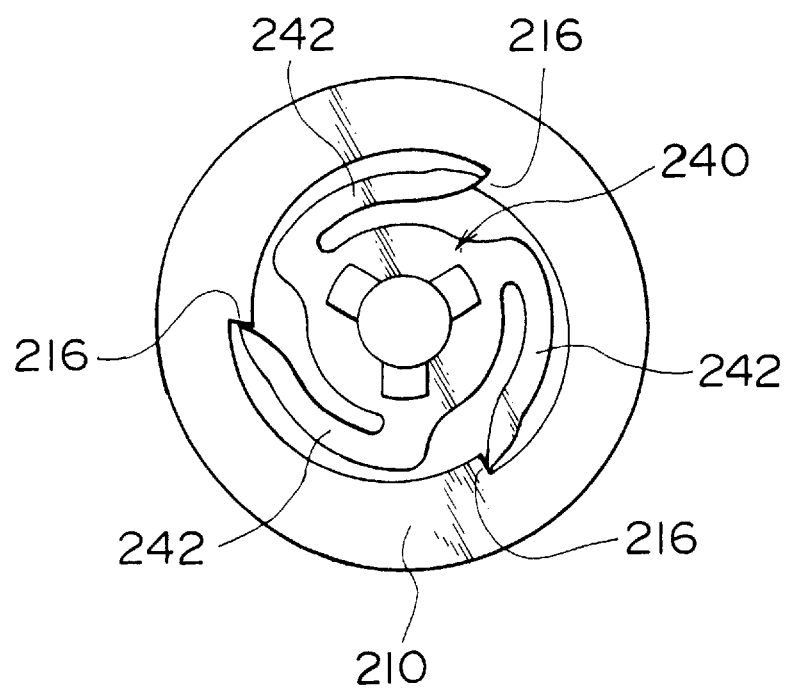
FIG. 15 is a view describing another example of a conventional one way clutch.

A pawl 162 is integrated with the clutch plate 160 in the rotating direction. The pawl 162 extends from its base end 162A at an angle of more than 180° along the circumference (see FIGS. 13(a) and 13(b)). In FIGS. 13(a) and 13(b), the pawl 162 extends at an angle of 180° however, the pawl may be extended at an angle of more than 180°. The clutch plate 160 is made of plastic, etc., and the pawl 162 is elastically swingable in the diametrical direction of the clutch plate 160 with the base end 162A of the pawl 162 being a joint.

A concave 173 is formed around the shaft at the top of the driven gear 170, and the clutch plate 160 is mounted in the concave 173. A projection 176 is formed at the side of the concave 173, that is, on an inner peripheral surface 174 of the driven gear 170. A step formed by the projection 176 engages with an end 162B of the pawl 162 only when the clutch plate 160 rotates clockwise in the drawing, relatively to the driven gear 170. When the clutch plate 160 rotates counterclockwise in the drawing, relatively to the driven gear 170, the pawl 162 elastically swings to avoid the engaging. That is, the sharp step is formed for the end 162B of the pawl 162 to abut against when the clutch plate 160 rotates clockwise. The inner peripheral surface 174 is smooth and inclined toward a top 176A of the projection 176, and a side 162c of the end of the pawl 162 slides on the inner peripheral surface 174 when the clutch plate 160 rotates counterclockwise.

Next, an explanation will be given about the operation of the clutch structure with reference to FIGS. 13(a) and 13(b).

When the driving gear 152 rotates clockwise relatively to the driven gear 170, the end 162B of the pawl 162 of the clutch plate 160 engages with the step of the projection 176 formed on the inner peripheral surface 174 of the driven gear 170 as shown in FIG. 13(a). The driving force is transmitted from the driving gear 152 (driving side) to the driven gear 170 (driven side) by the above-stated engagement, and the driven gear 170 and the driving gear 152 rotate in one united body. Such a state is referred to as an engaging state.

If the angular velocity of the driven gear 170 is higher than the angular velocity of the driving gear 152, the driving gear 152 rotates counterclockwise relatively to the driven gear 170, and the end 162B of the pawl 162 of the clutch plate 160 disengages from the projection 176 on the inner peripheral surface 174. Thereby, the driving force is not transmitted from the driving gear 152 to the driven gear 170, and the clutch plate 160 runs idle. Such state is referred to as a disengaging state or an idle running state.

While running idle, the clutch plate 160 rotates counterclockwise relatively to the driven gear 170. A smooth inclined surface 178 is formed on the inner peripheral surface 174 of the driven gear 170 in the rotating direction toward the top 176A of the projection 176. Thus, as the end 162B of the pawl 160 becomes closer to the projection 176, the side 162C of the end 162B of the pawl 160 abuts against the inclined surface 178 and slides thereon as shown in FIG. 13(b). The pawl 162 of the clutch plate 160 is pushed and curved to the inside in the diametrical direction by the inclined surface 178. When the pawl 162 passes the projection 176, the pawl 162 is released from the curved state, and the pawl 162 falls into the step of the projection 176 due to the restitutive elasticity. Thus, the pawl 162 avoids the engagement with the projection 176 when the clutch plate 160 rotates counterclockwise relatively to the driven gear 170.

When the clutch shifts from the engaging state to the disengaging state (the idle running state), only the end 162B of the pawl 162 of the clutch plate 160 disengages from the projection 176 on the inner peripheral surface 174 of the driven gear 170. For this reason, there is such an advantage that the load change is small in the rotating direction.

The pawl 162 extends along the circumference of the clutch plate 60 from the base end 162A at an angle of 180°. Thereby, the spring constant and the stiffness of the pawl 162 are small. Thus, while the clutch runs idle, the load change in the diameter direction of rotation (in the direction of a normal line of the circumference), which occurs when the pawl 162 swings in the diameter direction to climb over the projection 176, is controlled to be small.

Furthermore, there is provided one pawl 162 of the clutch plate 160, and one projection 176 of the driven gear 170, which engages with the pawl 162. For this reason, the pawl 162 climbs over once while the clutch plate 160 rotates once relatively to the driven gear 170. Thus, the load changes infrequently per rotation. Thereby, the load change in the diameter direction can be significantly decreased.

Next, an explanation will be given about the operation of the camera with the magnetic recording function in view of the relation between the clutch structure and the magnetic recording.

When the takeup spool 15 catches the film 58 supplied from the cartridge 12, the film 58 is wound up by the takeup spool 15 at a speed higher than a speed at which the film 58 is supplied by the spool driving shaft 14 of the cartridge chamber.

Since the film 58 within the cartridge 12 is loosened (see FIG. 10) just after the film 58 is wound onto the takeup spool 15, the driving force is transmitted from the motor 16 to the spool driving shaft 14 via the gear train 118 and the gear 51 shown in FIG. 7. The loosened film 58 is gradually tightened because of the difference between the winding speed of the takeup spool 15 and the supplying speed of the spool driving shaft 14. After several frames are photographed and the takeup spool 15 takes up the film 58, the film 58 in the cartridge 12 is completely tightened (see FIG. 11).

When the film 58 in the cartridge 12 is tightened completely, the spool 13 of the cartridge 12 is rotated at the same speed as the winding speed by the tension of the film 58 wound up by the takeup spool 15. In this case, the rotation of the spool 13 of the cartridge 12 is transmitted to the driven gear 115 via the spool driving shaft 14, the spool gear 51 and the gear train 118. The angular velocity of rotation of the driven gear 115 becomes higher than that of the driving gear 117 at the clutch part, and the clutch runs idle.

In the clutch structure, when the clutch shifts from the engaging state to the disengaging (idle running) state as depicted in FIGS. 13(a) and 13(b), the change in the load and the film transport speed is extremely small. For this reason, even if the clutch starts running idle during the magnetic recording, the intervals of the magnetic recording signals can be kept uniform, and the magnetic recording can be performed satisfactorily.

Thereafter, the clutch runs idle while the film 58 is transported. Since the pawl 162 of the clutch plate 160 is long and has small stiffness, the load change in the diameter direction is small when the pawl 162 climbs over the projection 176. In addition, since the pawl 162 climbs over the step of the projection 176 only once per rotation, the load change is extremely small to such an extent as to be ignored while the clutch runs idle. Thereby, the intervals of the magnetic recording signals can be kept uniform, and the magnetic recording can be performed satisfactorily.

As set forth hereinabove, one planet gear mechanism and one clutch are incorporated into the film transport device so that the structure can be simple and the incorporation space can be saved. Moreover, since the clutch is adopted as a mechanism for making the spool driving shaft free after the photographic film is taken up by the takeup spool, the film transport speed can be maintained uniform.

Moreover, in the present invention, the inner rotating member is provided with one pawl which swings elastically in the diameter direction, and the end of the pawl engages with the projection of the outer rotating member only during the unidirectional rotation. Thus, the load change in the rotating direction can be small enough that it can be ignored when the clutch shifts from the engaging state to the disengaging (idle running) state. Furthermore, the pawl extends along the circumference and has a central angle of more than 180° from its base end to its tip, and thereby the pawl has smaller stiffness than a short pawl of less than 180°, and the load change can be small while the clutch runs idle. Moreover, the number of pawls is one, and the pawl climbs over the projection formed at the outer rotating member only once per rotation while the clutch runs idle. For this reason, the load change is smaller than in the case when there is a plurality of pawls. Thereby, the load change in the diameter direction can be significantly reduced. The above-described clutch structure is particularly effective with the magnetic recording function, which records the magnetic information while the film is transported. It is possible to control the load change in the rotating direction when the one way clutch shifts from the engaging state to the disengaging state and the load change in the diameter direction of rotation while the clutch runs idle, and the film transport speed can be maintained uniform. Thus, the pitches of the magnetic write signals can be kept uniform, and the errors in reading the information can be decreased.

Figure 16:
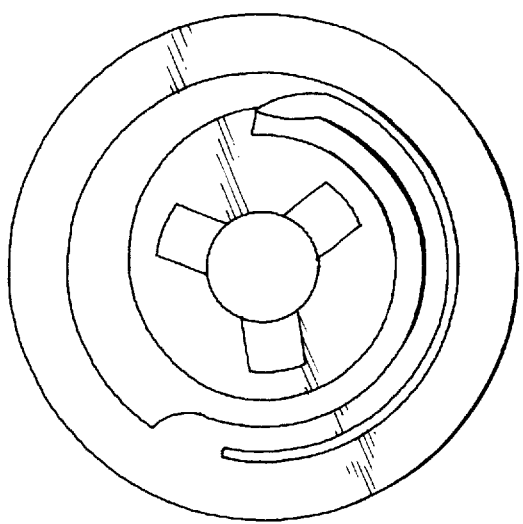
FIG. 16 is a view of the clutch with the pawl extending from an other rotating member.

The one way clutch of the present invention may be constructed in the following two ways: the inner rotating member is the driver connected with the motor and the outer rotating member is the follower; and the outer rotating member is the driver and the inner rotating member is the follower. The extending direction of the pawl of the inner rotating member and the projecting direction of the projection of the outer rotating member are determined based on the rotating direction of the driving force which is transmitted through the clutch in the engaging state. Furthermore, the inner rotating member may be provided with the projection and the outer rotating member may be provided with the pawl, as illustrated in FIG. 16.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A film transporting device of a camera, comprising:

a cartridge chamber for housing a cartridge in which photographic film is wound around a single spool rotatably provided at a casing of said cartridge;

a spool driving member for transmitting rotational driving force to said spool, said spool driving member coupling with said spool of said cartridge housed in said cartridge chamber;

a takeup spool for taking up said photographic film supplied from said cartridge;

a takeup spool driving member for transmitting rotational driving force to said takeup spool;

a single motor capable of rotating forward and backward;

a planetary mechanism consisting of a sun gear to which rotational driving force is transmitted from said motor, separate first and second planet gears each engaging with said sun gear, and a carrier supporting said first and second planet gears;

a spool driving force transmission mechanism including a first transmission gear engaged with said first planet gear when rotational driving force of said motor in a first direction is transmitted to said sun gear and said carrier is positioned at a film winding position, and second transmission gear engaged with said second planet gear when rotational driving force of said motor in a second direction is transmitted to said sun gear and said carrier is positioned at a film rewinding position, said spool driving force transmission mechanism transmitting rotational driving force in a film feed direction from said first transmission gear to said spool driving member, and transmitting rotational driving force in a film rewind direction from said second transmission gear to said spool driving member;

a takeup spool driving force transmission mechanism including a third transmission gear engaged with said second planet gear when said rotational driving force of said motor in said first direction is transmitted to said sun gear and said carrier is positioned at said winding position, said takeup spool driving force transmission mechanism transmitting rotational driving force in a film takeup direction from said third transmission gear to said takeup spool driving member; and a clutch provided between said first and second transmission gears, said clutch prohibiting rotational driving force applied to said first transmission gear by said spool driving member from being transmitted to said first transmission gear when said carrier is positioned at said film winding position.

2. The film transporting device of the camera as defined in claim 1, wherein:

said first and second transmission gears are disposed coaxially with each other and rotatable relatively to each other; and said clutch is a one way clutch transmitting rotational driving force in only one direction from said first transmission gear to said second transmission gear.

3. The film transporting device of the camera as defined in claim 1, wherein said clutch comprises:

an inner rotating member having only one pawl on an outer peripheral surface thereof, said pawl extending in a circumferential direction of said inner rotating member and having a central angle of more than 180° from a base end thereof to a tip thereof, said tip being elastically swingable in a diametrical direction of said inner rotating member, the base of said pawl being fixed to said inner rotating member; and an outer rotating member coaxially surrounding said inner rotating member, said outer rotating member having an inner peripheral surface on which said tip of said pawl of said inner rotating member slides and having a projection on said inner peripheral surface, said projection engaging with said tip of said pawl of said inner rotating member only when said inner rotating member rotates relatively to said outer rotating member in a direction from said base end of said pawl to said tip of said pawl.

4. The film transporting device of the camera as defined in claim 3, wherein said projection numbers only one.

5. The film transporting device of the camera as defined in claim 4, wherein said projection rises gradually from said inner peripheral surface.

6. The film transporting device of the camera as defined in claim 1, wherein said clutch comprises:

an inner rotating member having a projection on an outer peripheral surface thereof; and an outer rotating member coaxially surrounding said inner rotating member, said outer rotating member having an inner peripheral surface on which said projection of said inner rotating member slides and having a single pawl on said inner peripheral surface, said pawl extending in a circumferential direction of said outer rotating member and having a central angle of more than 180° from a base end thereof to a tip thereof, said tip of said pawl being elastically swingable in a diametrical direction of said outer rotating member, said tip of said pawl engaging with said projection of said inner rotating member only when said outer rotating member rotates relatively to said inner rotating member in a direction from said base end of said pawl to said tip of said pawl.

7. A clutch structure comprising:

an inner rotating member having a single pawl on an outer peripheral surface thereof, said pawl extending in a circumferential direction of said inner rotating member and having a central angle of more than 180° from a base end thereof to a tip thereof, said tip being elastically swingable in a diametrical direction of said inner rotating member, the base of said pawl being fixed to said inner rotating member; and an outer rotating member coaxially surrounding said inner rotating member, said outer rotating member having an inner peripheral surface on which said tip of said pawl of said inner rotating member slides and having only one projection on said inner peripheral surface which rises gradually away from said inner peripheral surface, said projection engaging with said tip of said pawl of said inner rotating member only when said inner rotating member rotates relatively to said outer rotating member in a direction from said base end of said pawl to said tip of said pawl.

8. A clutch structure comprising:

an inner rotating member having a projection on an outer peripheral surface thereof; and an outer rotating member coaxially surrounding said inner rotating member, said outer rotating member having an inner peripheral surface on which said projection of said inner rotating member slides and having a single pawl on said inner peripheral surface, said pawl extending in a circumferential direction of said outer rotating member and having a central angle of more than 180° from a base end thereof to a tip thereof, said tip of said pawl being elastically swingable in a diametrical direction of said outer rotating member, said tip of said pawl engaging with said projection of said inner rotating member only when said outer rotating member rotates relatively to said inner rotating member in a direction from said base end of said pawl to said tip of said pawl.

9. The film transporting device of the camera as defined in claim 8, wherein said projection numbers only one.

10. The film transporting device of the camera as defined in claim 9, wherein said projection rises gradually from said outer peripheral surface.

11. A camera with a magnetic recording function, comprising:

a motor for supplying motive power for feeding photographic film on a frame-by-frame basis in all photographing, said photographic film being wound around a spool rotatably provided at a casing of a film cartridge;

first driving force transmission means for transmitting driving force of said motor to said spool, and for rotating said spool in a direction to supply said photographic film from said film cartridge when said photographic film is fed forward;

a takeup spool for taking up said photographic film supplied from said film cartridge;

second driving force transmission means for transmitting driving force of said motor to said takeup spool and for rotating said takeup spool in the same direction as the rotating direction of said spool at a higher speed than a film supplying speed when said photographic film is fed forward;

a one way clutch provided on a driving force transmission passage of said first driving force transmission means, said clutch comprising an inner rotating member having a single pawl on an outer peripheral surface thereof, said pawl extending in a circumferential direction of said inner rotating member and having a central angle of more than 180° from a base end thereof to a tip thereof, said tip being elastically swingable in a diametrical direction of said inner rotating member, said base being fixed to said inner rotating member, and an outer rotating member coaxially surrounding said inner rotating member, said outer rotating member having an inner peripheral surface on which said tip of said pawl of said inner rotating member slides and having only one projection on said inner peripheral surface, said projection engaging with said tip of said pawl of said inner rotating member only when said inner rotating member rotates relatively to said outer rotating member in a direction from said base end of said pawl to said tip of said pawl; and magnetic recording means for recording magnetic data relating to photographed frame images onto a magnetic recording layer on said photographic film while said photographic film is fed one frame at a time.

12. A camera with a magnetic recording function, comprising:

a motor for supplying motive power for feeding photographic film on a frame-by-frame basis in all photographing, said photographic film being wound around a spool rotatably provided at a casing of a film cartridge;

first driving force transmission means for transmitting driving force of said motor to said spool, and for rotating said spool in a direction to supply said photographic film from said film cartridge when said photographic film is fed forward;

a takeup spool for taking up said photographic film supplied from said film cartridge;

second driving force transmission means for transmitting driving force of said motor to said takeup spool and for rotating said takeup spool in the same direction as the rotating direction of said spool at a higher speed than a film supplying speed when said photographic film is fed forward;

a one way clutch provided on a driving force transmission passage of said first driving force transmission means, said clutch comprising an inner rotating member having a projection on an outer peripheral surface thereof; and an outer rotating member coaxially surrounding said inner rotating member, said outer rotating member having an inner peripheral surface on which said projection of said inner rotating member slides and having a single pawl on said inner peripheral surface, said pawl extending in a circumferential direction of said outer rotating member and having a central angle of more than 180° from a base end thereof to a tip thereof, said tip of said pawl being elastically swingable in a diametrical direction of said outer rotating member, said tip of said pawl engaging with said projection of said inner rotating member only when said outer rotating member rotates relatively to said inner rotating member in a direction from said base end of said pawl to said tip of said pawl; and magnetic recording means for recording magnetic data relating to photographed frame images onto a magnetic recording layer on said photographic film while said photographic film is fed one frame at a time.

\* \* \* \* \*